(12) United States Patent
Wu et al.

(10) Patent No.: US 9,590,540 B2
(45) Date of Patent: Mar. 7, 2017

(54) HYBRID PULSE WIDTH MODULATION METHOD FOR VARIABLE SPEED DRIVE

(71) Applicant: JOHNSON CONTROLS TECHNOLOGY COMPANY, Holland, MI (US)

(72) Inventors: Zhiqiao Wu, York, PA (US); Ajit W. Kane, York, PA (US); Shreesha Adiga-Manoor, York, PA (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/649,052

(22) PCT Filed: Jan. 28, 2014

(86) PCT No.: PCT/US2014/013272
§ 371 (c)(1),
(2) Date: Jun. 2, 2015

(87) PCT Pub. No.: WO2014/123713
PCT Pub. Date: Aug. 14, 2014

(65) Prior Publication Data
US 2015/0318803 A1    Nov. 5, 2015

Related U.S. Application Data

(60) Provisional application No. 61/762,080, filed on Feb. 7, 2013.

(51) Int. Cl.
*G05B 11/28* (2006.01)
*H02P 6/00* (2016.01)
(Continued)

(52) U.S. Cl.
CPC ......... *H02P 6/002* (2013.01); *F02M 25/0836* (2013.01); *H02M 1/12* (2013.01); *H02P 6/28* (2016.02)

(58) Field of Classification Search
CPC ........ H02M 1/00; H02M 1/38; H02M 3/3376; H02M 7/06; H02P 27/04; H05B 6/12
(Continued)

(56) References Cited

U.S. PATENT DOCUMENTS 7,439,702 B2 * 10/2008 Smith .................. F25B 31/006
                                                    318/701
8,193,756 B2 *  6/2012 Jadric .................. F25B 49/025
                                                    318/448

(Continued)

FOREIGN PATENT DOCUMENTS

JP    2005033972 A    2/2005
JP    2012130220 A    7/2012

*Primary Examiner* — Antony M Paul
(74) *Attorney, Agent, or Firm* — Fletcher Yoder, P.C.

(57) ABSTRACT

A system or method controlling a variable speed drive based on PWM techniques, wherein a first PWM method is used when the input current is less than a predetermined threshold value, for higher efficiency and lower total harmonic distortion (THD); and a second PWM method comprising a discontinuous modulation signal is used when the input current is greater than the predetermined threshold value for higher efficiency. By doing so, the maximum efficiency of VSD within the whole operation range can be achieved.

18 Claims, 9 Drawing Sheets

(51) Int. Cl.
*H02M 1/12* (2006.01)
*F02M 25/08* (2006.01)

(58) Field of Classification Search
USPC .... 318/400.01, 400.02, 400.14, 400.15, 599,
318/700, 701, 471, 800, 801, 430, 432,
318/437, 811; 363/40, 44, 95, 120, 21.1,
363/21.18, 25, 82; 388/800, 815, 819,
388/823, 833, 854
See application file for complete search history.

(56) References Cited

U.S. PATENT DOCUMENTS

| | | | |
|---|---|---|---|
| 8,817,506 B2* | 8/2014 | Shimomugi | H02M 3/1584 323/272 |
| 2007/0216344 A1 | 9/2007 | Welchko et al. | |
| 2010/0164581 A1 | 7/2010 | Zhang et al. | |
| 2012/0112674 A1 | 5/2012 | Schulz et al. | |
| 2013/0026958 A1 | 1/2013 | Adiga-Manoor et al. | |

* cited by examiner

HYBRID PULSE WIDTH MODULATION METHOD FOR VARIABLE SPEED DRIVE

CROSS-REFERENCE TO RELATED PATENT APPLICATIONS

This patent application claims priority from and the benefit of U.S. Provisional Patent Application Ser. No. 61/762,080, filed Feb. 7, 2013, entitled "HYBRID PULSE WIDTH MODULATION METHOD FOR VARIABLE SPEED DRIVE", which is hereby incorporated by reference.

BACKGROUND

The application generally relates to a method and system for controlling a variable speed drive (VSD). The application relates more specifically to a hybrid pulse width modulation (PWM) method and system for controlling a VSD.

Pulse Width Modulation (PWM) is a power modulation technique that has been to vary power output in a Variable Speed Drive (VSD) for a long time. Although several different PWM schemes exist, normally only one method is used to operate the VSD over the entire operating range.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

SUMMARY

The present disclosure defines an optimal Pulse Width Modulation (PWM) scheme for a Variable Speed Drive (VSD). In the disclosed system, when the input current is less than a predetermined threshold value, a first PWM method is used for higher efficiency and lower total harmonic distortion (THD). When the input current is greater than the predetermined threshold value, a second PWM method is going to be used for higher efficiency. The second PWM method is preferably a discontinuous PWM signal.

One embodiment relates to a method for controlling a VSD using a hybrid pulse width modulation (PWM) method includes providing a compressor, a condenser, and an evaporator connected in a closed refrigerant loop; a motor connected to the compressor to power the compressor; and the variable speed drive connected to the motor, the variable speed drive being configured to receive an input AC power at a fixed input AC voltage and a fixed input frequency and provide an output power at a variable voltage and variable frequency to the motor; determining an optimal threshold input current value for the variable speed drive; measuring actual input current value of the variable speed drive; comparing the actual current input value of the VSD with an optimal threshold current input value of the VSD; applying a first PWM method in response to the input current being less than the predetermined threshold input current value; and applying a second PWM mode in response to the input current being greater than the predetermined threshold value.

Another embodiment relates to a method for controlling a variable speed drive (VSD) including providing a VSD for driving a motor of a compressor; configuring the VSD to operate with an input AC voltage at a fixed AC input voltage and provide an output AC power at a variable voltage and variable frequency; determining a threshold value for an input current to the VSD; measuring an input current to the VSD; comparing the measured input current with the threshold value; applying a continuous PWM method to the VSD in response to the input current being less than the threshold value; and applying a discontinuous PWM method in response to the input current being greater than or equal to the threshold value.

Still another embodiment relates to a method for controlling a VSD comprising applying a continuous PWM scheme when an input current is less than a predetermined threshold value, to provide higher efficiency and lower total harmonic distortion (THD); and applying a discontinuous PWM method comprising a discontinuous modulation scheme when the input current is greater than the predetermined threshold value.

Certain advantages of the embodiments described herein are improved overall efficiency of the variable speed drive by reducing switching losses, and improved THD. The present disclosure enables a variable speed drive to achieve the maximum overall efficiency as well as minimum Total Harmonic Distortion (THD) within its whole operating range.

Alternative exemplary embodiments relate to other features and combinations of features as may be generally recited in the claims.

DETAILED DESCRIPTION OF THE EXEMPLARY EMBODIMENTS

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1A:
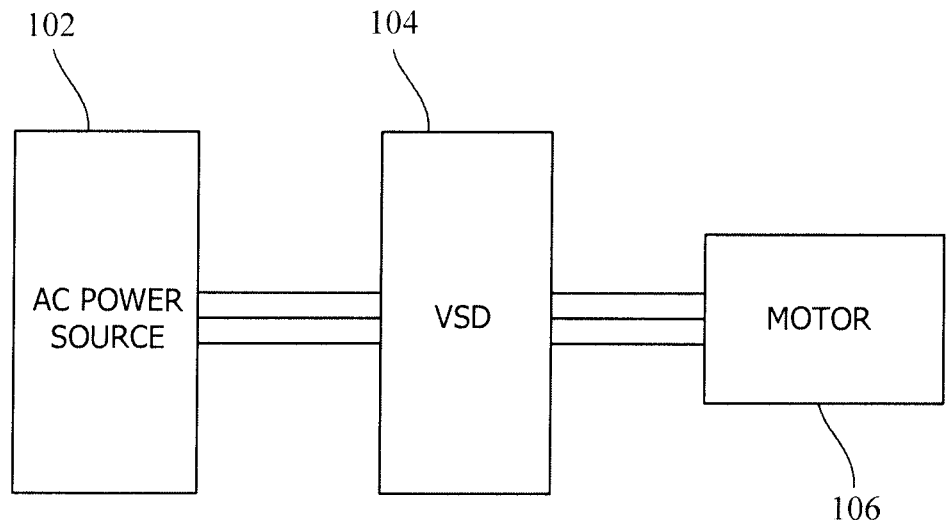
FIGS. 1A and 1B generally illustrate configurations for HVAC systems powered by variable speed drives.
Figure 1B:
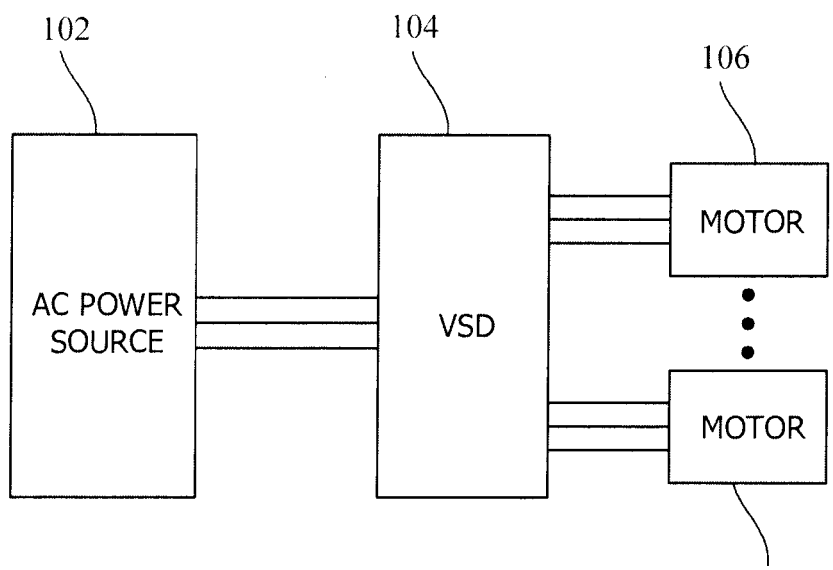

FIGS. 1A and 1B generally illustrate system configurations. An AC power source 102 supplies a variable speed drive (VSD) 104, which powers a motor 106 (see FIG. 1A) or motors 106 (see FIG. 1B). The motor(s) 106 is preferably used to drive a corresponding compressor of a refrigeration or chiller system (see generally, FIG. 3). The AC power source 102 provides single phase or multi-phase (e.g., three phase), fixed voltage, and fixed frequency AC power to the VSD 104 from an AC power grid or distribution system that is present at a site. The AC power source 102 preferably can supply an AC voltage or line voltage of 200 V, 230 V, 380 V, 460 V, or 600 V, at a line frequency of 50 Hz or 60 Hz, to the VSD 104 depending on the corresponding AC power grid.

The VSD 104 receives AC power having a particular fixed line voltage and fixed line frequency from the AC power source 102 and provides AC power to the motor(s) 106 at a desired voltage and desired frequency, both of which can be varied to satisfy particular requirements. Preferably, the VSD 104 can provide AC power to the motor(s) 106 having higher voltages and frequencies and lower voltages and frequencies than the rated voltage and frequency of the motor(s) 106. In another embodiment, the VSD 104 may again provide higher and lower frequencies but only the same or lower voltages than the rated voltage and frequency of the motor(s) 106. The motor(s) 106 is a permanent magnet motor or an induction motor, but can include any type of motor that is capable of being operated at variable speeds. The motor can have any suitable pole arrangement including two poles, four poles or six poles.

Figure 2A:
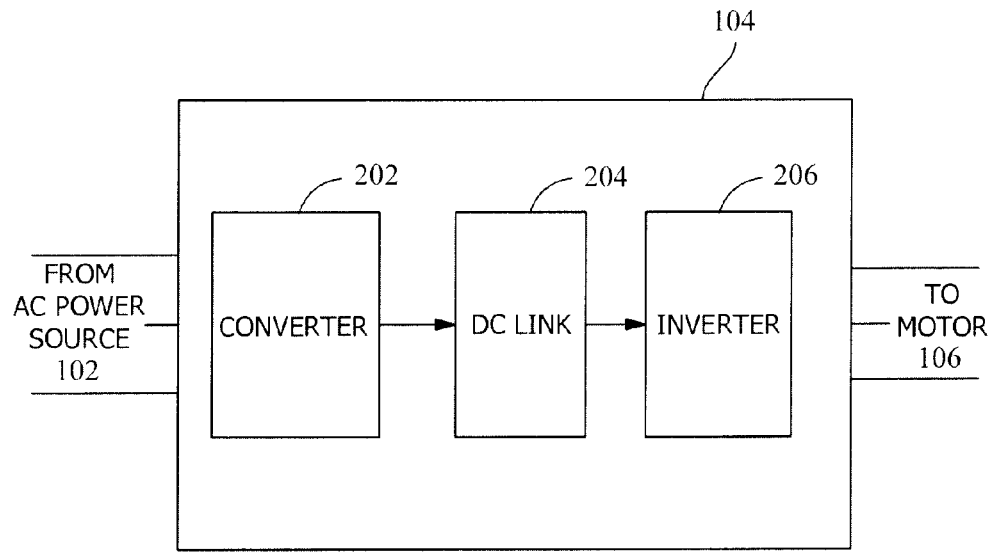
FIGS. 2A and 2B illustrate schematically embodiments of variable speed drives.
Figure 2B:
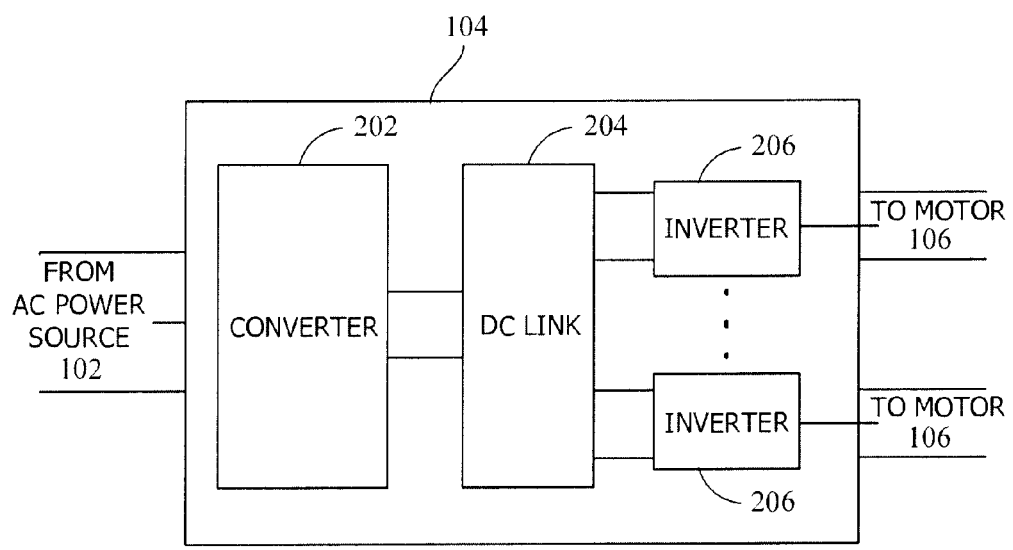

FIGS. 2A and 2B illustrate different embodiments of the VSD 104. The VSD 104 can have three stages: a converter stage 202, a DC link stage 204 and an output stage having one inverter 206 (see FIG. 2A) or a plurality of inverters 206 (see FIG. 2B). The converter 202 converts the fixed line frequency, fixed line voltage AC power from the AC power source 102 into DC power. The DC link 204 filters the DC power from the converter 202 and provides energy storage components. The DC link 204 can be composed of capacitors, inductors, or a combination thereof, which are passive devices that exhibit high reliability rates and very low failure rates. Finally, in the embodiment of FIG. 2A, the inverter 206 converts the DC power from the DC link 204 into variable frequency, variable voltage AC power for the motor 106 and, in the embodiment of FIG. 2B, the inverters 206 are connected in parallel on the DC link 204 and each inverter 206 converts the DC power from the DC link 204 into a variable frequency, variable voltage AC power for a corresponding motor 106. The inverter(s) 206 can be a power module that can include power transistors, insulated gate bipolar transistor (IGBT) power switches and inverse diodes interconnected with wire bond technology. Furthermore, it is to be understood that the DC link 204 and the inverter(s) 206 of the VSD 104 can incorporate different components from those discussed above so long as the DC link 204 and inverter(s) 206 of the VSD 104 can provide the motors 106 with appropriate output voltages and frequencies.

With regard to FIGS. 1B and 2B, the inverters 206 are jointly controlled by a control system such that each inverter 206 provides AC power at the same desired voltage and frequency to corresponding motors based on a common control signal or control instruction provided to each of the inverters 206. In another embodiment, the inverters 206 are individually controlled by a control system to permit each inverter 206 to provide AC power at different desired voltages and frequencies to corresponding motors 106 based on separate control signals or control instructions provided to each inverter 206. This capability permits the inverters 206 of the VSD 104 to more effectively satisfy motor 106 and system demands and loads independent of the requirements of other motors 106 and systems connected to other inverters 206. For example, one inverter 206 can be providing full power to a motor 106, while another inverter 206 is providing half power to another motor 106. The control of the inverters 206 in either embodiment can be by a control panel or other suitable control device.

For each motor 106 to be powered by the VSD 104 there is a corresponding inverter 206 in the output stage of the VSD 104. The number of motors 106 that can be powered by the VSD 104 is dependent upon the number of inverters 206 that are incorporated into the VSD 104. In one embodiment, there can be either 2 or 3 inverters 206 incorporated in the VSD 104 that are connected in parallel to the DC link 204 and used for powering a corresponding motor 106. While the VSD 104 can have between 2 and 3 inverters 206, it is to be understood that more than 3 inverters 206 can be used so long as the DC link 204 can provide and maintain the appropriate DC voltage to each of the inverters 206.

Figure 3:
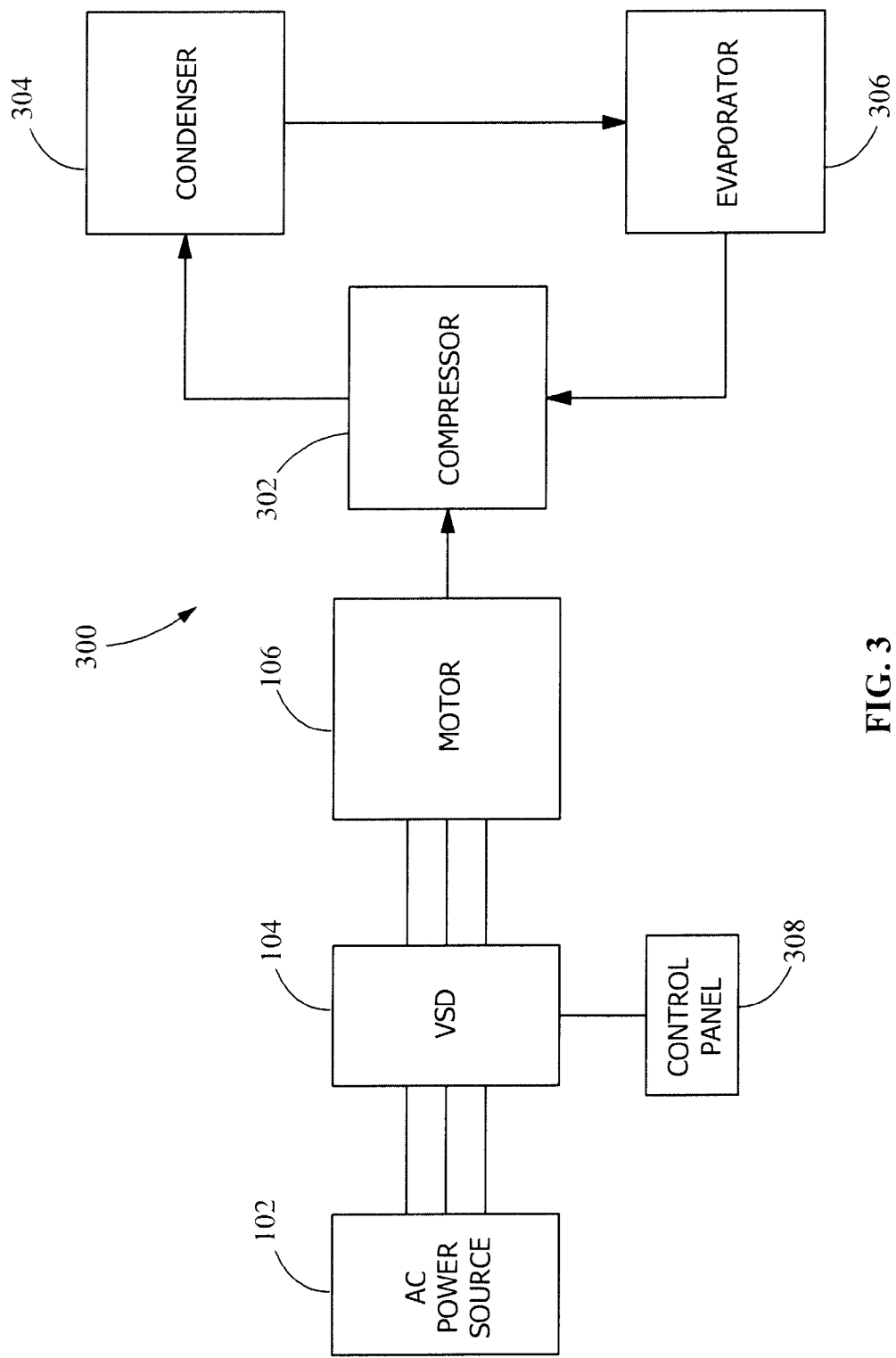
FIG. 3 illustrates schematically a refrigeration system.

FIG. 3 illustrates generally one embodiment of a refrigeration or chiller system using the system configuration and VSD 104 of FIGS. 1A and 2A. As shown in FIG. 3, the HVAC, refrigeration or liquid chiller system 300 includes a compressor 302, a condenser arrangement 304, a liquid chiller or evaporator arrangement 306 and the control panel 308. The compressor 302 is driven by motor 106 that is powered by VSD 104. The VSD 104 receives AC power having a particular fixed line voltage and fixed line frequency from AC power source 102 and provides AC power to the motor 106 at desired voltages and desired frequencies, both of which can be varied to satisfy particular requirements. The control panel 308 can include a variety of different components such as an analog to digital (A/D) converter, a microprocessor, a non-volatile memory, and an interface board, to control operation of the refrigeration system 300. The control panel 308 can also be used to control the operation of the VSD 104, and the motor 106.

Compressor 302 compresses a refrigerant vapor and delivers the vapor to the condenser 304 through a discharge line. The compressor 302 can be any suitable type of compressor, e.g., screw compressor, centrifugal compressor, reciprocating compressor, scroll compressor, etc. The refrigerant vapor delivered by the compressor 302 to the condenser 304 enters into a heat exchange relationship with a fluid, e.g., air or water, and undergoes a phase change to a refrigerant liquid as a result of the heat exchange relationship with the fluid. The condensed liquid refrigerant from condenser 304 flows through an expansion device (not shown) to the evaporator 306.

The evaporator 306 can include connections for a supply line and a return line of a cooling load. A secondary liquid, e.g., water, ethylene, calcium chloride brine or sodium chloride brine, travels into the evaporator 306 via return line and exits the evaporator 306 via supply line. The liquid refrigerant in the evaporator 306 enters into a heat exchange relationship with the secondary liquid to lower the temperature of the secondary liquid. The refrigerant liquid in the evaporator 306 undergoes a phase change to a refrigerant vapor as a result of the heat exchange relationship with the secondary liquid. The vapor refrigerant in the evaporator 306 exits the evaporator 306 and returns to the compressor 302 by a suction line to complete the cycle. It is to be understood that any suitable configuration of condenser 304 and evaporator 306 can be used in the system 300, provided that the appropriate phase change of the refrigerant in the condenser 304 and evaporator 306 is obtained.

The HVAC, refrigeration or liquid chiller system 300 can include many other features that are not shown in FIG. 3. These features have been purposely omitted to simplify the drawing for ease of illustration. Furthermore, while FIG. 3 illustrates the HVAC, refrigeration or liquid chiller system 300 as having one compressor connected in a single refrigerant circuit, it is to be understood that the system 300 can have multiple compressors, powered by a single VSD as shown in FIGS. 1B and 2B or multiple VSDs, see generally, the embodiment shown in FIGS. 1A and 2A, connected into each of one or more refrigerant circuits.

Referring again to FIGS. 2A and 2B, converter 202 can be a pulse width modulated boost converter or rectifier having insulated gate bipolar transistors (IGBTs) to provide a boosted DC voltage to the DC link 204 to obtain a maximum fundamental RMS output voltage from the VSD 104 greater than the nominal RMS fundamental input voltage of the VSD 104. In an embodiment, the VSD 104 can provide a maximum output voltage that is greater than the fixed nominal fundamental RMS input voltage provided to the VSD 104 and a maximum fundamental RMS output frequency that is greater than the fixed nominal fundamental RMS input frequency provided to the VSD 104. Furthermore, it is to be understood that the VSD 104 can incorporate different components from those shown in FIGS. 2A and 2B so long as VSD 104 can provide motor 106 with appropriate output voltages and frequencies.

Figure 4:
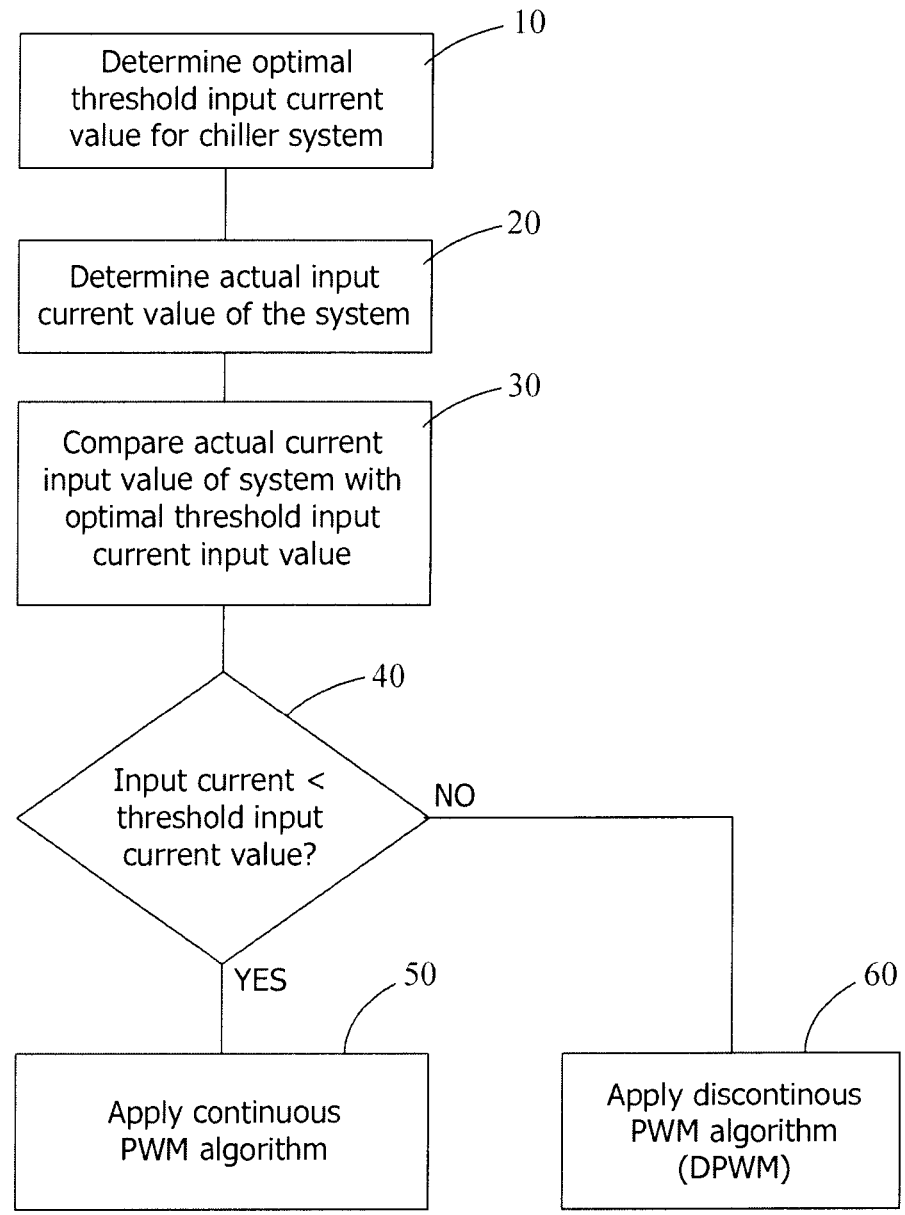
FIG. 4 is a flow diagram for a method of controlling a VSD with a hybrid PWM technique.

Referring to FIG. 4, a method for controlling VSD 104 using a hybrid PWM method to improve overall system efficiency and Total Harmonic Distortion (THD) over the entire operating range of the VSD is disclosed. At step 10, an optimal threshold input current value for the system, e.g., a chiller system, is determined. At step 20, an actual input current value of the system 104 is determined. Next, at step 30, the actual current input value of VSD 104 is compared with the optimal threshold current input value of VSD 104. The system proceeds to step 40, and if the input current is lower than the predetermined threshold input current value, a continuous PWM method is applied at step 50 to control the rectifier power switches, e.g., by applying a continuous PWM algorithm to rectifier switches via control panel 308. The continuous PWM mode provides greater efficiency and lower Total Harmonic Distortion (THD) than discontinuous PWM mode. If at step 40 the input current is greater than the predetermined threshold value, the system proceeds to step 60, and control panel 308 changes the PWM mode applied to the rectifier switches to the discontinuous PWM (DPWM) mode.

Figure 8:
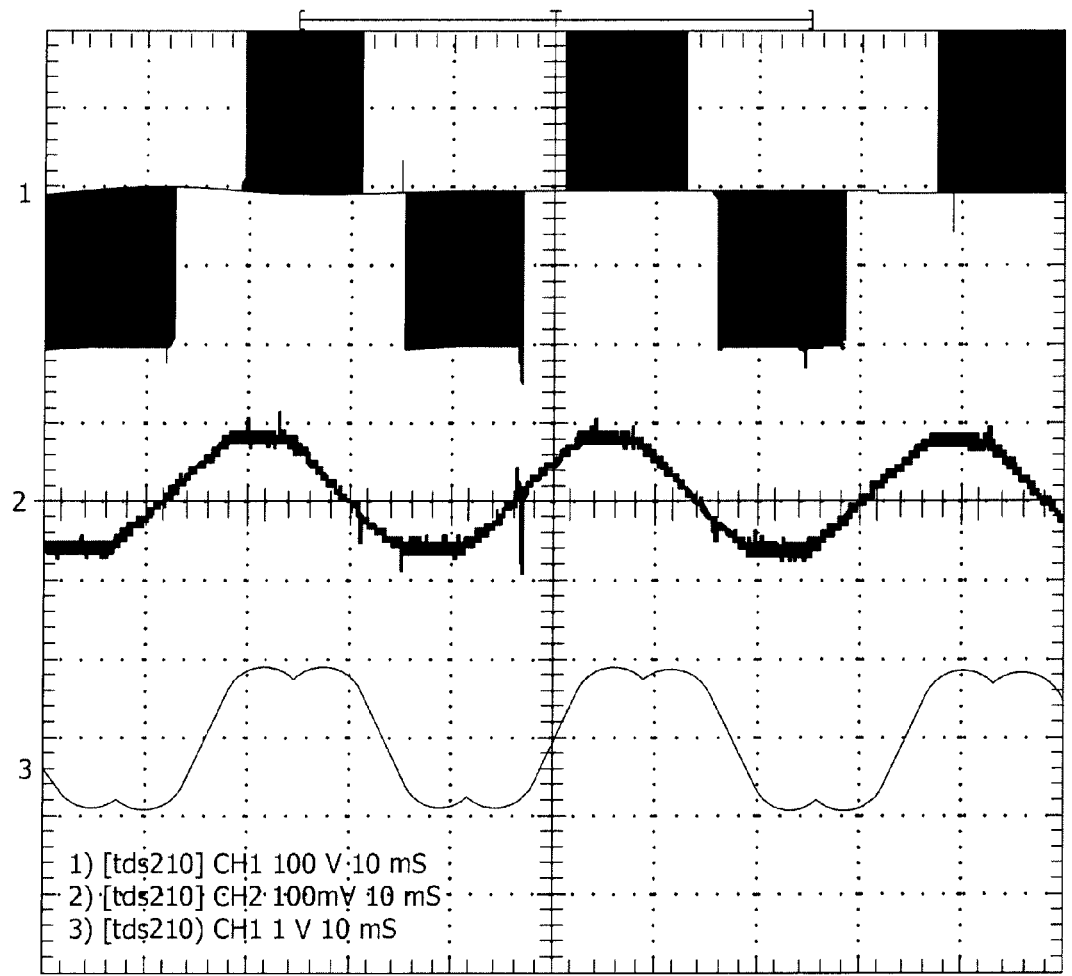
FIG. 8 is a graph of an exemplary continuous PWM mode showing the actual PWM signal waveform, the voltage output waveform and the modulation index waveform.
Figure 9:
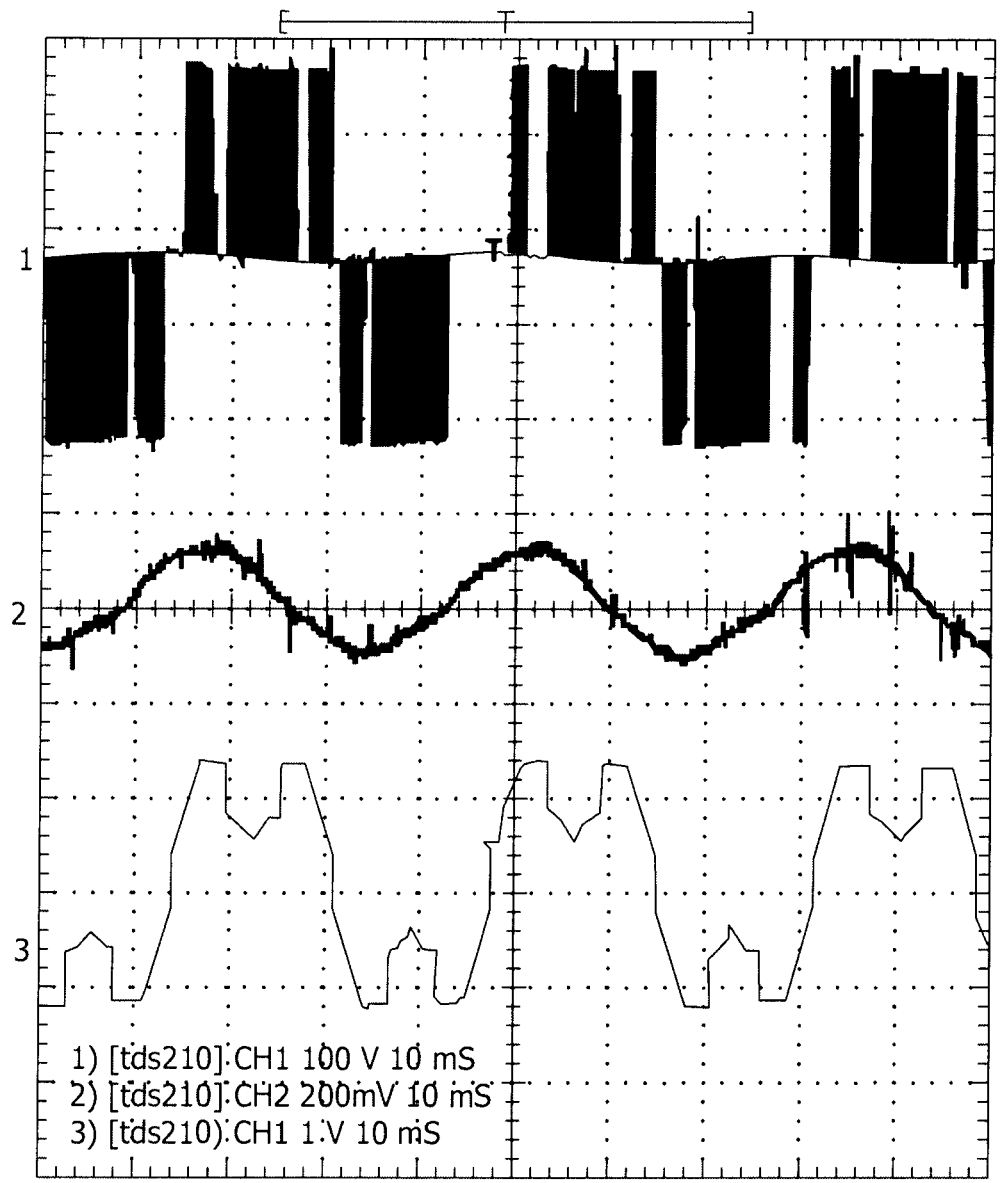
FIG. 9 is a graph of an exemplary discontinuous PWM mode showing the actual PWM signal waveform, the voltage output waveform and the modulation index waveform.

FIG. 8 is a graph of an exemplary continuous PWM mode showing the actual PWM signal waveform, the voltage output waveform and the modulation index waveform for a continuous PWM mode. FIG. 9 is a graph of an exemplary discontinuous PWM mode showing the actual PWM signal waveform, the voltage output waveform and the modulation index waveform for a discontinuous PWM mode. When discontinuous PWM mode is applied, the IGBT will not switch for one third of the cycle. When continuous PWM mode is applied, the IGBT will switch over the entire cycle. Thus, switching losses are reduced when discontinuous PWM mode is applied.

Figure 7:
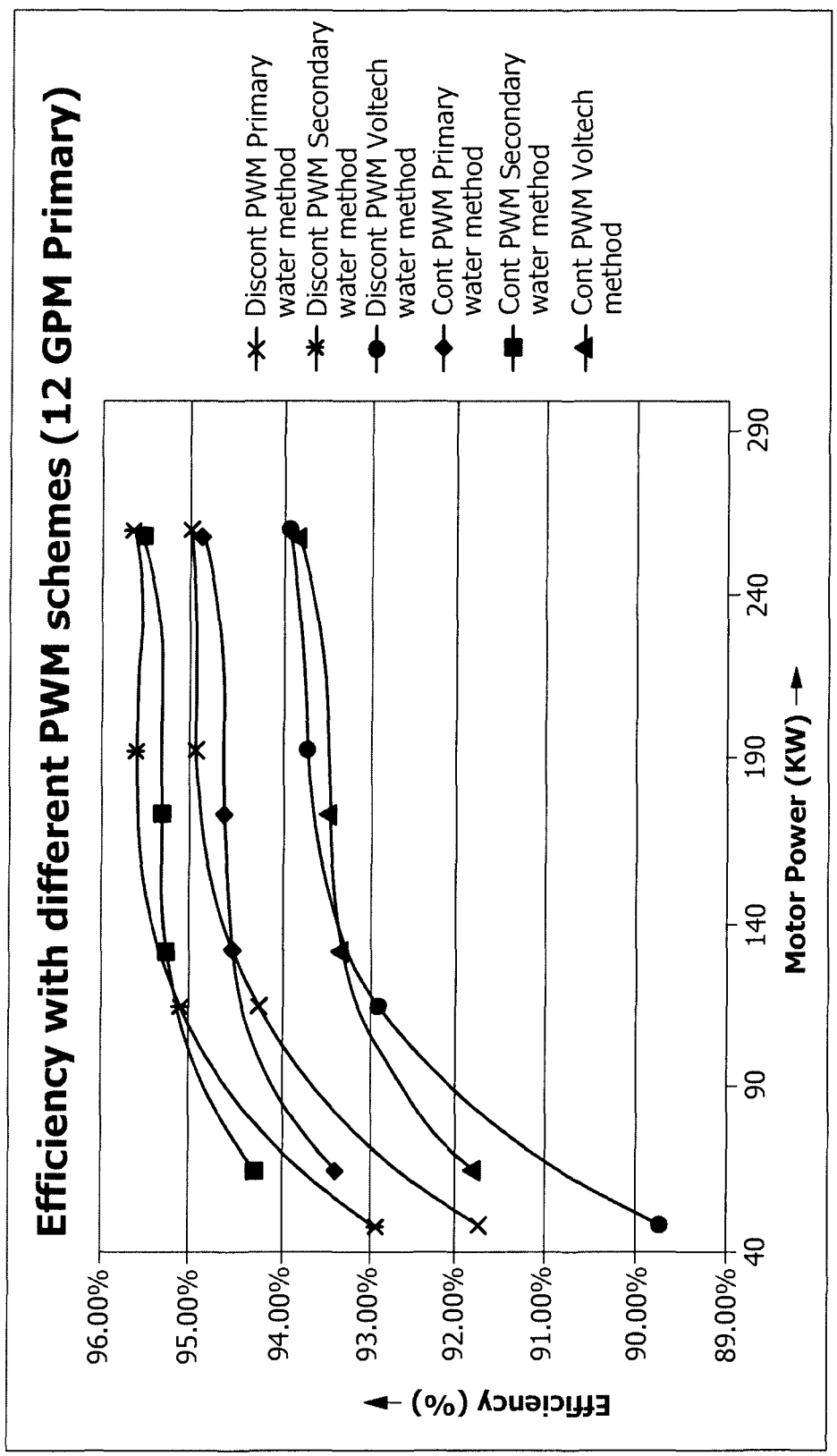
FIG. 7 is a graph of efficiency percentage versus motor power (KW) for various PWM methods.

When VSD 104 is operating at a speed that is below a threshold input current value or, alternately, a predetermined threshold speed, a continuous PWM is applied to control the rectifier power switches. When VSD 104 is operating at input current greater than the predetermined threshold input current value, or alternately, the predetermined threshold speed, a Discontinuous PWM method is applied to control the rectifier power switches. An optimal input current threshold value for different sizes of VSDs may be determined, e.g., through testing of the chiller system to create an operating map of system efficiency versus motor power as shown in FIG. 7. By using the proposed method, the overall system efficiency can be improved. The other benefit of this hybrid PWM method is lower input current Total Harmonic Distortion (THD) value at low power range, which will reduce the power losses in power wiring and upstream supply transformer, as well as reduce the Electromagnetic Interference (EMI) to other equipments on the same power line.

Figure 5:
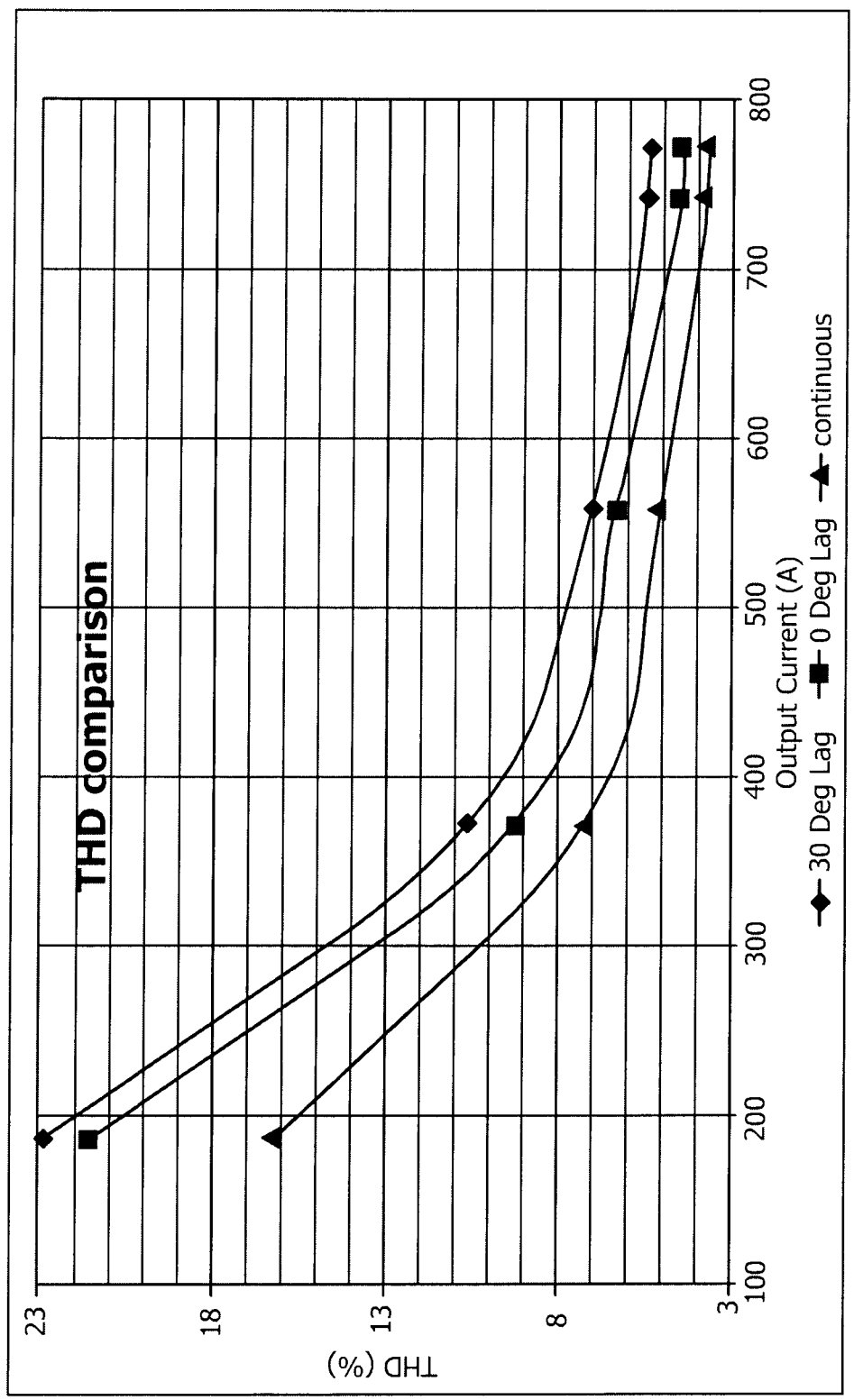
FIG. 5 is a graph representing percent THD versus VSD output current for various PWM methods.
Figure 6:
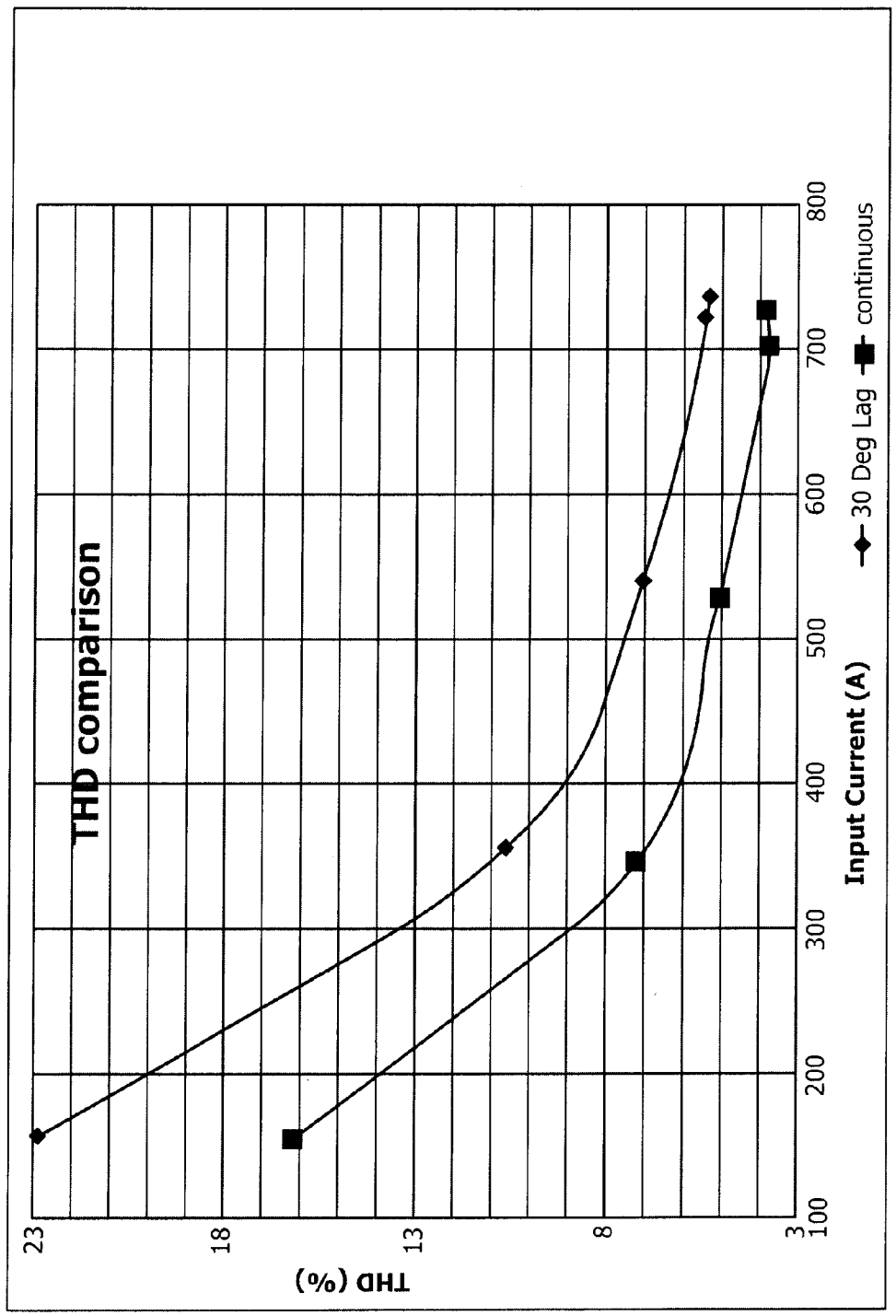
FIG. 6 is a graph of percent (%) THD versus VSD input current for various PWM methods.

FIGS. 5 and 6 are graphs that illustrate exemplary comparisons of total harmonic distortion (THD) versus VSD input and output currents. FIG. 5 shows percent THD versus VSD output current (amperes) for a continuous PWM method 501, a discontinuous PWM method with 0 degree lag 502 and for a discontinuous PWM method with 30 degree lag 503. The continuous PWM method 501 has lower THD over the operating range of about 180 amps to about 780 amps. FIG. 6 is a graph of percent THD versus output current for discontinuous PWM with 30 degree lag 601, and continuous PWM 602. Again, continuous PWM 602 provides the lowest THD over the operating range of the motor.

FIG. 7 is a graph of efficiency versus motor power (KW) for various PWM methods. There are three ways to measure the VSD efficiency on a chiller. They are voltech 701, secondary water loop method 702, primary water loop method 703. The testing results show that continuous PWM method has higher efficiency at low power range and lower efficiency at high power range compared with the discontinuous PWM method. It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the PWM method as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A method for controlling a variable speed drive (VSD) using a hybrid pulse width modulation (PWM) method comprising:
providing a compressor, a condenser, and an evaporator connected in a closed refrigerant loop; a motor connected to the compressor to power the compressor; and the variable speed drive connected to the motor, the variable speed drive being configured to receive an input AC power at a fixed input AC voltage and a fixed input frequency and provide an output power at a variable voltage and variable frequency to the motor;
determining an optimal threshold input current value for the variable speed drive;
determining an actual input current value of the variable speed drive;
comparing the actual current input value of the VSD with an optimal threshold current input value of the VSD;
applying a first PWM method comprising a continuous PWM method in response to the input current being less than the predetermined threshold input current value; and
applying a second PWM method comprising a discontinuous PWM method in response to the input current being greater than the predetermined threshold value.

2. The method of claim 1, further comprising controlling a plurality of rectifier power switches of the VSD when applying the first PWM method and the second PWM method to adjust an output of an inverter.

3. The method of claim 1, wherein the step of determining the optimal input current threshold value further comprises determining the optimal input current threshold value from an operating map of method efficiency versus motor power.

4. The method of claim 3, further comprising applying the first PWM method and the second PWM method to reduce an input current Total Harmonic Distortion (THD) value and to reduce an electromagnetic interference to other equipments on an input power line.

5. The method of claim 1, wherein the VSD comprises a converter connected to an AC power source providing the input AC voltage, the converter being configured to convert the input AC voltage to a boosted DC voltage; a DC link connected to the converter, the DC link being configured to filter and store the boosted DC voltage from the converter; and at least one inverter connected to the DC link.

6. The method of claim 5, further comprising:
jointly controlling each of the at least one inverters to provide the output power at a desired voltage and frequency to the motor or motors based on a common control signal or control instruction provided to each of the inverters.

7. The method of claim 5, further comprising:
individually controlling each inverter to provide the output power at a plurality of desired voltages and frequencies to each corresponding motor based on separate control signals or control instructions provided to each of the inverters.

8. The method of claim 5, wherein the converter comprises a plurality of insulated gate bipolar transistors (IGBTs); and wherein when the second PWM mode is applied, the converter IGBTs do not switch for one third of a cycle.

9. The method of claim 8, wherein when continuous PWM mode is applied and the converter IGBTs switch over the entire cycle.

10. A method for controlling a variable speed drive (VSD) comprising:
providing a variable speed drive for driving a motor of a compressor;
configuring the variable speed drive to operate with an input AC voltage at a fixed AC input voltage and provide an output AC power at a variable voltage and variable frequency;
determining a threshold value for an input current to the VSD;
measuring an input current to the VSD;
comparing the measured input current with the threshold value;
applying a continuous pulse width modulation (PWM) method to the VSD in response to the input current being less than the threshold value; and
applying a discontinuous PWM method in response to the input current being greater than or equal to the threshold value.

11. The method of claim 10, further comprising controlling a plurality of rectifier power switches of a converter of the VSD when applying the continuous PWM method and the discontinuous PWM method to adjust an output of an inverter.

12. The method of claim 10, wherein the step of determining the optimal input current threshold value further comprises determining the optimal input current threshold value from an operating map of method efficiency versus motor power.

13. The method of claim 12, further comprising applying the continuous PWM method and the discontinuous PWM method selectively to reduce an input current Total Harmonic Distortion (THD) value and to reduce an electromagnetic interference to other equipments on an input power line.

14. The method of claim 10, wherein the VSD comprises a converter connected to an AC power source providing the input AC voltage, the converter being configured to convert the input AC voltage to a boosted DC voltage; a DC link connected to the converter, the DC link being configured to filter and store the boosted DC voltage from the converter; and at least one inverter connected to the DC link.

15. The method of claim 14, further comprising:
jointly controlling each of the at least one inverters to provide the output power at a desired voltage and frequency to the motor or motors based on a common control signal or control instruction provided to each of the inverters.

16. The method of claim 14, further comprising:
individually controlling each inverter to provide the output power at a plurality of desired voltages and frequencies to each corresponding motor based on separate control signals or control instructions provided to each of the inverters.

17. The method of claim 10, wherein the continuous PWM method provides a higher efficiency and lower total harmonic distortion (THD) in the VSD.

18. A method for controlling a variable speed drive based on PWM schemes comprising:
   applying a continuous PWM scheme when an input current is less than a predetermined threshold value, to provide higher efficiency and lower total harmonic distortion (THD); and
   applying a discontinuous PWM method comprising a discontinuous modulation scheme when the input current is greater than the predetermined threshold value.

* * * * *